US010761209B2

(12) United States Patent
Waslowski et al.

(10) Patent No.: US 10,761,209 B2
(45) Date of Patent: Sep. 1, 2020

(54) TRIANGULATION LIGHT SENSOR

(71) Applicant: SICK AG, Waldkirch/Breisgau (DE)

(72) Inventors: Kai Waslowski, Emmendingen (DE);
Ingolf Hörsch, Freiburg (DE);
Gerhard Merettig, Sexau (DE);
Matthias Götz, Freiburg (DE)

(73) Assignee: SICK AG, Waldkirch/Breisgau (DE)

( * ) Notice: Subject to any disclaimer, the term of this patent is extended or adjusted under 35 U.S.C. 154(b) by 132 days.

(21) Appl. No.: 16/213,061

(22) Filed: Dec. 7, 2018

(65) Prior Publication Data

US 2019/0179014 A1    Jun. 13, 2019

(30) Foreign Application Priority Data

Dec. 13, 2017  (EP) .................................. 17207042

(51) Int. Cl.
*G01S 17/04* (2020.01)
*G01S 7/481* (2006.01)
*G01S 17/48* (2006.01)
*G01V 8/20* (2006.01)

(52) U.S. Cl.
CPC ............ *G01S 17/04* (2020.01); *G01S 7/4815* (2013.01); *G01S 17/48* (2013.01); *G01V 8/20* (2013.01)

(58) Field of Classification Search
CPC ..... G01B 11/002; G01S 7/4815; G01S 17/04; G01S 17/48; G01V 8/20
USPC ........................................................ 356/623
See application file for complete search history.

(56) References Cited

U.S. PATENT DOCUMENTS

| 4,105,925 | A | * | 8/1978 | Rossol | ................. | G01B 11/002 |
| | | | | | | 250/559.36 |
| 6,121,605 | A | | 9/2000 | Blumcke et al. | | |
| 6,959,103 | B2 | * | 10/2005 | Matsunaga | .......... | G01B 11/024 |
| | | | | | | 342/95 |
| 2002/0097404 | A1 | | 7/2002 | Waslowski et al. | | |
| 2003/0059087 | A1 | | 3/2003 | Waslowski et al. | | |
| 2013/0135627 | A1 | * | 5/2013 | Essig | ................... | G01B 11/028 |
| | | | | | | 356/623 |
| 2017/0186183 | A1 | * | 6/2017 | Armstrong | ............. | G01C 11/00 |
| 2018/0217259 | A1 | * | 8/2018 | Ando | ......................... | G01S 7/51 |
| 2018/0246190 | A1 | * | 8/2018 | Zhokhavets | .......... | G01S 7/4808 |

(Continued)

FOREIGN PATENT DOCUMENTS

| DE | 19962701 A1 | 6/2001 |
| DE | 10059156 A1 | 6/2002 |
| DE | 10138609 A1 | 2/2003 |

(Continued)

OTHER PUBLICATIONS

Search Report dated Jun. 6, 2018 issued in corresponding European Application No. 17207042.7.

*Primary Examiner* — Michael A Lyons
(74) *Attorney, Agent, or Firm* — Nath, Goldberg & Meyer; Jerald L. Meyer

(57) ABSTRACT

The present invention relates to a triangulation light sensor for the detection of objects on a conveying path having a light transmitter for transmitting transmitted light into a detection zone that extends over a part region of the conveying path, having a light receiver, a reception optics arranged in an optical path between the detection zone and the light receiver, and an evaluation unit that is configured for generating an object detection signal from the received signals.

20 Claims, 5 Drawing Sheets

(56) References Cited

U.S. PATENT DOCUMENTS

Figure 1:
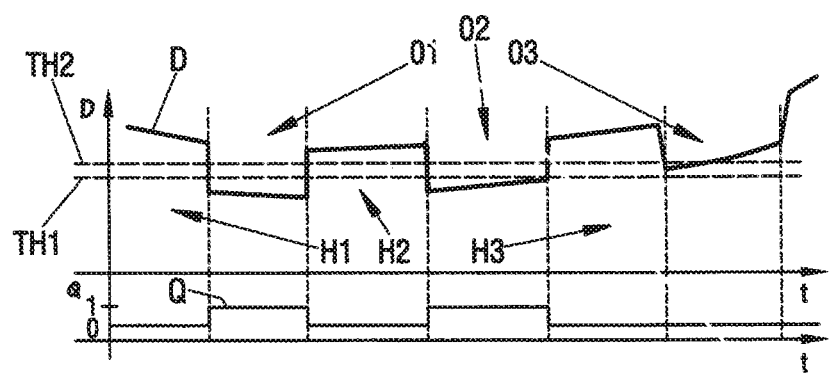

2018/0275310 A1* 9/2018 Horsch .................... G01V 8/20
2019/0049581 A1* 2/2019 Waslowski ........... H03K 17/968

FOREIGN PATENT DOCUMENTS

DE   202014103068 U1   11/2015
EP         0891044 A1    1/1999

* cited by examiner

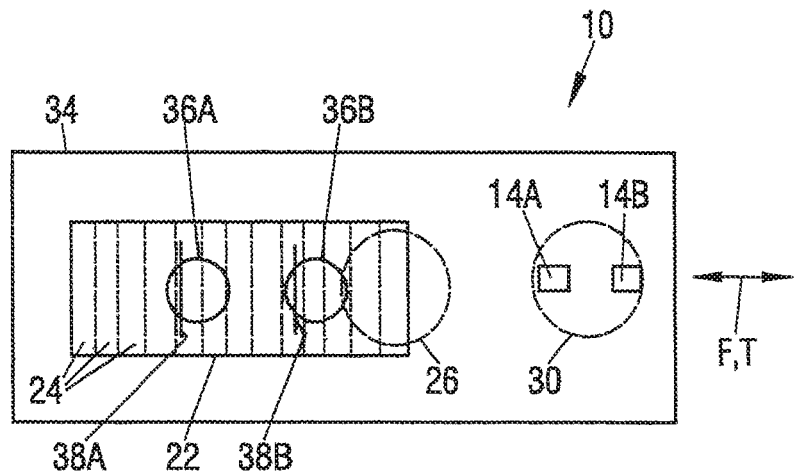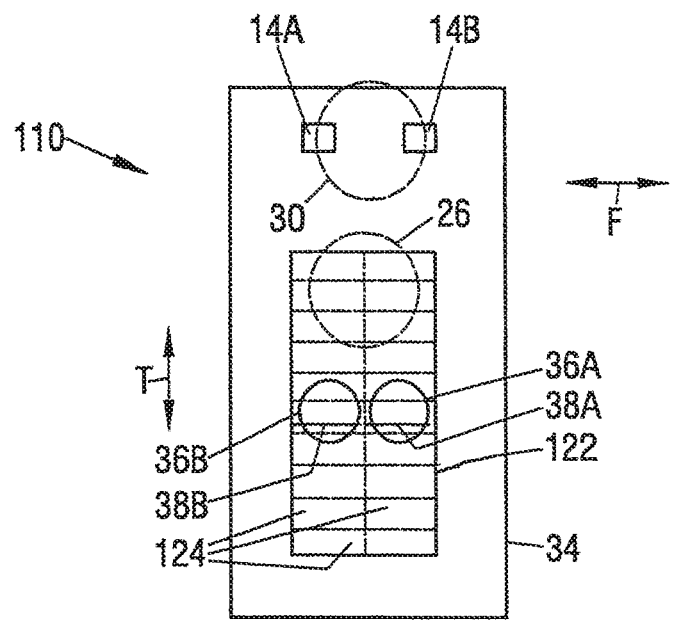

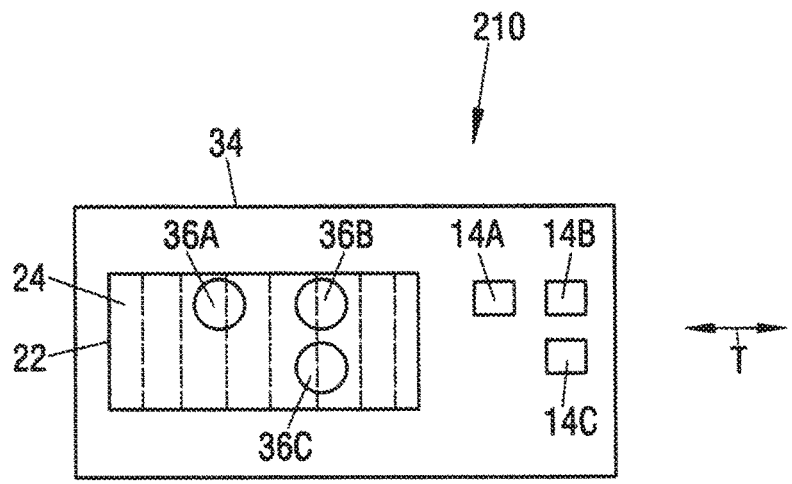
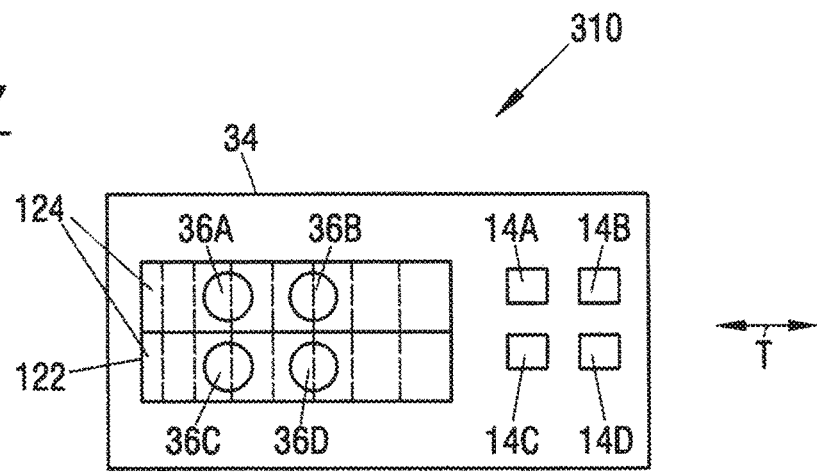

TRIANGULATION LIGHT SENSOR

The present invention relates to a triangulation light sensor for the detection of objects on a conveying path having a light transmitter for transmitting transmitted light into a detection zone that extends over a part region of the conveying path, having a light receiver having an array of reception elements for receiving light that is remitted from the detection zone by an object to be detected or by the conveying path, wherein the array of reception elements at least extends in a triangulation direction, and wherein the reception elements generate respective received signals, having a reception optics arranged in the optical path between the detection zone and the light receiver for generating at least one light spot from the remitted light on the light receiver, wherein the position of the at least one light spot on the light receiver in the triangulation direction results in dependence on the distance of a point of incidence of the transmitted light on an object to be detected or on the conveying path from the triangulation light sensor, and having an evaluation unit that is configured for generating an object detection signal from the received signals, wherein an object detection signal is only generated when a distance value of the point of incidence determined with reference to the position of the at least one light spot on the light receiver falls below a predefined distance threshold value.

It is known to determine the presence and/or distance of objects in a monitored zone using a light sensor that works in accordance with the triangulation principle. Such a triangulation light sensor comprises a light transmitter, for example a light emitting diode or a laser, and optionally a transmission optics to transmit a transmitted light beam into a detection zone to an object to be detected that may be present there. The transmitted light can be remitted by such an object, i.e. can be diffusely or reflectively reflected, and can be detected by a light receiver that forms a reception unit together with a reception optics. The light receiver in known solutions comprises at least one array of photosensitive reception elements.

The position of a light spot generated by the remitted light on the light receiver in the so-called triangulation direction changes in dependence on the distance between the triangulation light sensor and the remitting object. There is a clear geometrical relationship between the point of incidence on the light receiver and the distance of the detected object. The distance between the object and the light sensor can thus be determined by evaluating the light distribution on the light receiver. To in particular achieve a high accuracy in the distance determination, such a light receiver has to have a plurality of photosensitive reception elements that are arranged next to one another in the triangulation direction.

It can furthermore be determined with a corresponding evaluation of the light distribution on the light receiver whether an object is located inside or outside a sensing region, i.e. whether the distance of the object is inside or outside a predefined limit also called a sensing distance.

In triangulation light sensors having background suppression, the light receiver comprises at least two reception elements, wherein a so-called near element is arranged such that it is impacted by a light beam when it is remitted from an object that is located within a near zone in front of the triangulation light sensor and wherein a so-called far element is arranged such that it is impacted by a light beam that is reflected by an object that is located in a far zone in front of the triangulation light sensor. The far zone is here by definition further remote from the triangulation light sensor than the near zone. A difference between the photodiode currents of the reception elements of these two zones can be formed for the signal evaluation.

To be able to reliably detect objects that are located on a conveying path, for example on a conveying belt, a sensing distance or a distance threshold value is defined, wherein the objects to be detected are associated with the near zone in dependence on their height, i.e. on the distance of an object surface detected by the transmitted light from the conveying path, whereas the conveying path itself is associated with the far zone. The area the conveying path defines is also called the background.

The sensing distance or the distance threshold value thus determines the switching point of the triangulation light sensor that decides whether an object detection signal is generated or is not generated. The effective distance resolution of the triangulation light sensor must be higher than the height of the objects to be detected.

If the distance between the triangulation light sensor and the background, i.e. the conveying path, changes by an order of magnitude corresponding to the height of the objects to be detected for which the triangulation light sensor is set up, malfunctions in the object detection can occur that can be expressed both as false positive object detection signals and as false negative object detection signals.

This problem will be explained with reference to FIG. 1. The time progression of the distance D of the point of incidence of the transmitted light on an object to be detected or on the conveying path is shown in the upper part of the graph. The sensing distance is defined by two distance threshold values TH1, TH2 in FIG. 1. The associated object detection signal Q in the form of logic values is shown in the lower part of FIG. 1, wherein no object detection signal Q is generated at a state of 0 and an object detection signal Q is generated at a value of 1. The state of the object detection signal Q changes from 0 to 1 when the distance falls below the distance threshold value TH1 and changes from 1 to 0 when the distance D exceeds the distance threshold value TH2. The distance between the distance threshold values TH1 and TH2 thus defines a switching hysteresis. The time periods in which an object is located in the detection zone of the triangulation light sensor are called object zones O1 to O3. The time periods in which no object is located in the detection zone and thus only the background is detected by the triangulation light sensor are called background zones H1 to H3. The object zones O1 to O3 and the background zones H1 to H3 are separated from one another by perpendicular dashed lines.

It can easily be recognized in FIG. 1 that a correct generation of the object detection signal Q takes place in the object zones O1 and O3 and in the background zones H1 to H3. In the object zone O3, however, the determined distance value D is no longer below the distance threshold value TH1, which has the result that an object detection signal Q is erroneously no longer generated, i.e. the object detection signal Q maintains its logic value O-

In the present text, the term pairs of object detection signal present/not present, on the one hand, and object detection signal equal to 1/equal to 0, on the other hand, are used as synonyms.

The distance threshold value in particular has to be placed very close to the distance of the background from the light sensor in the detection of flat objects having a small height. If now the degree by which the distance between the light sensor and the background changes, for example due to mechanical fluctuations of the conveying path, is larger than the height of the objects to be detected, a reliable object recognition is no longer ensured.

A triangulation sensor is described in DE 100 59 156 that has an additional channel, where, to increase the object distance, the measurement channel and the additional channel are evaluated together to increase the reliability.

Methods with which the position of a light spot can be determined with high resolution are described in DE 199 62 701.

It is the object of the invention to provide a triangulation light sensor of the initially named kind that has an improved detection security.

The object is satisfied by a triangulation light sensor having the features of claim 1. In accordance with the invention, the evaluation unit is configured to replace the previous distance threshold value cyclically with a new distance threshold value, wherein the new distance threshold value is determined by a currently determined distance value less a predefined first hysteresis value when the currently determined distance value is greater than the previous distance threshold value and/or the new distance threshold value is determined by the currently determined distance value plus a predefined second hysteresis value when the currently determined distance value is smaller than the previous distance threshold value.

The distance threshold value is thus not static, but can rather be dynamically adapted to any vertical fluctuations of the conveying path. If it is, for example, determined that the conveying path moves away from the light sensor and the determined distance value thus increases, the distance threshold value is generally likewise increased. The condition according to which the currently determined distance value should be greater than the previous distance threshold value corresponds to the case that the conveying path or generally a background is scanned and the condition according to which the currently determined distance value should be smaller than the previous distance threshold value corresponds to a scanning of an object. In general, an adaptation of the distance threshold value can take place in both said cases, with it, however, also being possible only to perform the adaptation on a scanning of the background or only on a scanning of an object. However, an adaptation of the distance value both with reference to the background and with reference to the object has proved the most sensible since a continuous adaptation is thereby ensured and it is avoided that a relevant change of the vertical location of the background is not detected due to too long a break between two adaptations.

As already mentioned, the distance threshold value is a threshold value for the distance, i.e. a switching threshold for a distance signal whose exceeding or falling below results in a generation or switching off of the object detection signal.

The cyclic replacement of the distance threshold value is understood as a replacement at certain points in time, with the time between two adaptations being able to be fixedly predefined or also variable. In the latter case, it can also be dependent on additional conditions, for example on a conveying speed of the conveying path.

Said distance value does not necessarily have to be an absolute value in a length unit, but the distance value can rather also generally be a distance signal that is in a clear relationship, but not necessarily in a linear relationship, with the distance. The distance value can, for example, be represented by a voltage, load, a current, or a position on the light receiver. The same accordingly also applies accordingly to the distance threshold value.

To take into account that the light spot has a certain spatial extent, a position of the light spot on the light receiver can, for example, be defined by its focal point or by its median.

The first and second hysteresis values are preferably the same. Said hysteresis values define the difference between the current distance value and the distance threshold value and can be fixed or adjustable in order, for example, to be able to carry out an adaptation of the triangulation light sensor to a typical object height. It is, however, generally also possible to use different first and second hysteresis values.

In accordance with an advantageous embodiment, the new distance threshold value determined from the distance value and the one of the hysteresis values is modified before the replacement of the previous distance threshold value such that a change of the new distance threshold value in comparison with the previous distance threshold value does not exceed a predefined measure. Jumps that are too large on the adaptation of the distance threshold value can hereby be avoided, for example. The modification thus in particular represents a kind of low pass filtering. For example, a maximum permitted change of the distance threshold value can be defined on the basis of an absolute change, i.e. on a difference between the old and the new threshold values, or on the basis of a relative change, i.e. on a change rate.

It has proven to be advantageous for the light sensor to comprise at least two light sources for transmitting respective transmitted light beams, with the light sources being arranged such that the transmitted light beams are incident on laterally mutually spaced apart points of incidence on an object to be detected or on the conveying path, with the evaluation unit being configured to determine a respective distance value for each transmitted light beam, and with the replacement of the distance threshold value only taking place when the difference of the respective scanning values determined for the mutually spaced apart points of incidence is smaller than a predefined distance threshold value. The reliability in the adaptation of the distance threshold value on the adaptation of the distance threshold value can be considerably improved by such a double scanning or multiple scanning since an adaptation of the distance threshold value only takes place when the same distance or the same object height was determined at both points of incidence or scanning positions. Incorrect adaptations of the distance threshold value can thus be avoided such as can, for example, occur when an object edge is just being scanned and when a distance value is determined on the basis thereof that is between the actual object height and the distance from the background. This could in particular be critical when the conveying path is stationary and a multiple scanning and an adaptation of the distance threshold value were to take place at just that moment.

It can furthermore be avoided by such a double scanning or multiple scanning that an object surface extending at a slant to the conveying direction is interpreted as an assumed height change of the conveying path.

The distance threshold value and/or the distance value on whose basis the object detection signal is generated can either be determined on the basis of one of the at least two distance values, i.e. for the transmitted light beam of a specific one of the at least two light sources, or on the basis of a plurality of distance values, e.g. by averaging.

The feature according to which the transmitted light beams are incident on an object to be detected or on the conveying path at laterally mutually spaced apart points of incidence in particular relates to these points of incidence being in an imaginary reference plane so that these points of incidence are at least laterally spaced apart for a predefined distance from the light sensor. If namely the transmitted light beams are not perpendicularly incident on an object or on the conveying path, the distances between the two point of incidences could be dependent, viewed in projection, on whether the point of incidence of a respective transmitted light beam is on an object or on the conveying path.

The at least two light sources can be arranged in a row or also—with more than two slight sources—in the form of a two-dimensional array, e.g. in the form of an L with three light sources or in the form of a rectangle or a square with four light sources. The points of incidence then have a corresponding arrangement, optionally increased by the transmission optics, i.e. they are likewise arranged in a row or as a two-dimensional array in the above-mentioned imaginary reference plane.

The smaller the distance of two mutually adjacent light sources and thus the distance of the points of incidence is, the faster the light sensor can react to changes in the vertical location of the background to also compensate oscillations of a higher frequency of the transport belt. The distance of the light sources is, for example, smaller than 1 mm, preferably smaller than 200 μm. Relatively compact and space-saving light receivers can thereby also be used.

The light sources are advantageously integrated on a single carrier, in particular on a single semiconductor substrate. An example for this are so-called multipixel LEDs. The desired small light source distance can thus be implemented with a high precision.

The feature according to which the replacement of the distance threshold value only takes place when the difference of the respective scanning values determined for the mutually spaced apart points of incidence is smaller than a predefined distance threshold value explicitly also comprises the case that, with three or more light sources and with the corresponding number of determined distance vales as the minuend or as the subtrahend, a mean value of two scanning values is used instead of one single scanning value in the difference formation.

The replacement of the distance threshold value advantageously further only takes place when the difference of the respective distance values determined for the mutually spaced apart points of incidence is smaller for a predetermined time period than the predefined distance threshold value. The condition for a distance threshold value adaptation according to which the distance values have to be as close one another as possible thus not only has to be satisfied for a specific observation time, but optionally also for a specific time period so that the risk of incorrect adaptations of the distance threshold value can be reduced even still further.

The replacement of the distance threshold value advantageously takes place such that respective instantaneous distance threshold values are determined for a predefined number of cycles and the new distance threshold value is determined on the basis of an averaging process from the instantaneous distance threshold values. Too great a fluctuation of the distance threshold value can thereby be avoided that is due, for example, to statistical measurement value fluctuations. A weighted or unweighted mean value formation or a compensation method, in particular a determination of a best fit line, can, for example, be used as the averaging method. Whereas the mean value formation effects a greater noise reduction, the formation of a best fit line results in a faster adaptation to changes of the vertical location of the background. The averaging method can be a rolling one, i.e. the oldest instantaneous distance threshold value is replaced by the latest instantaneous distance threshold value after each cycle.

It has proven to be advantageous for the points of incidence to be at least spaced apart from one another along a conveying direction. A type of edge detection therefore takes place in the conveying direction. In addition, one or more further light sources can also be arranged such that further points of incidence are scanned that are spaced apart from one another transversely to the conveying direction.

In accordance with a further advantageous embodiment, the light sources are arranged such that the light spots generated on the light receiver by the respective transmitted light beams are spaced apart from one another for the same distances of the points of incidence, in particular in the triangulation direction. It is thereby ensured that the respective light spots can be reliably separated from one another. Alternatively, it is also possible that the light spots are spaced apart from one another transversely to the triangulation direction. In this case, a detection of the light spots could, for example, take place by a multilinear light receiver having separate reception zones for the respective light spots or also by a plurality of light receivers.

In accordance with a further advantageous embodiment, the light sources can be activated in a clocked manner with a time offset so that only one of the light sources or at least only some of the light sources transmits/transmit transmitted light at a given point in time. It is thereby possible to carry out an unambiguous distance determination separately for each point of incidence. A superposition by light spots generated by different light sources is thereby avoided. The evaluation of the received signals takes place in a correspondingly clocked manner, i.e. the received signals are associated with the respective active light source. The frequency of the clocking can be selected as substantially arbitrary. A respective transmitted light pulse can be transmitted by one of the light sources every 80 μs, for example.

The light sources can generally, however, also be able to be actuated simultaneously, in particular permanently, if a differentiation of the two or more light spots by the light receiver or by the evaluation unit is possible. If the light receiver has a plurality of lines with which a respective plurality of light sources are associated, light sources that are associated with different lines can also be simultaneously activated to enable a parallel detection of a plurality of light spots. In other words, only one respective light source per line is active here.

The triangulation direction advantageously extends in parallel with the conveying direction. If the light sources are additionally arranged such that the light spots generated on the light receiver by the respective transmitted light beams for the same distances of the respective points of incidence in the triangulation direction are spaced apart from one another, the two or more distance values can optionally be determined simultaneously, i.e. during a single measurement procedure.

Further advantageous embodiments of the invention result from the dependent claims, from the description and from the drawings.

Figure 2:
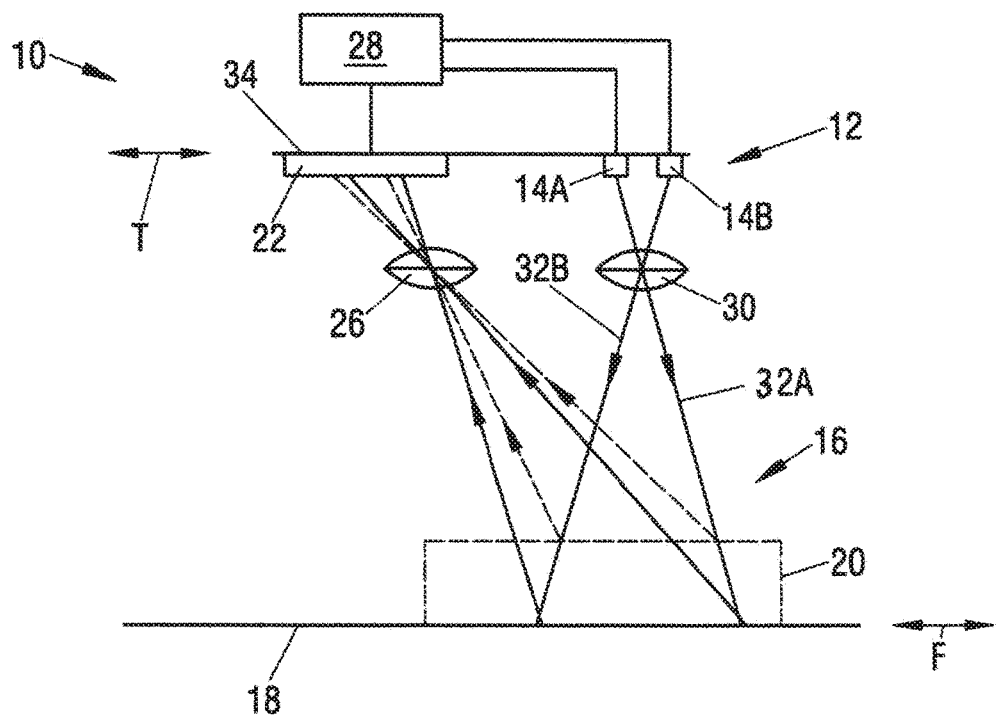
Figure 5:
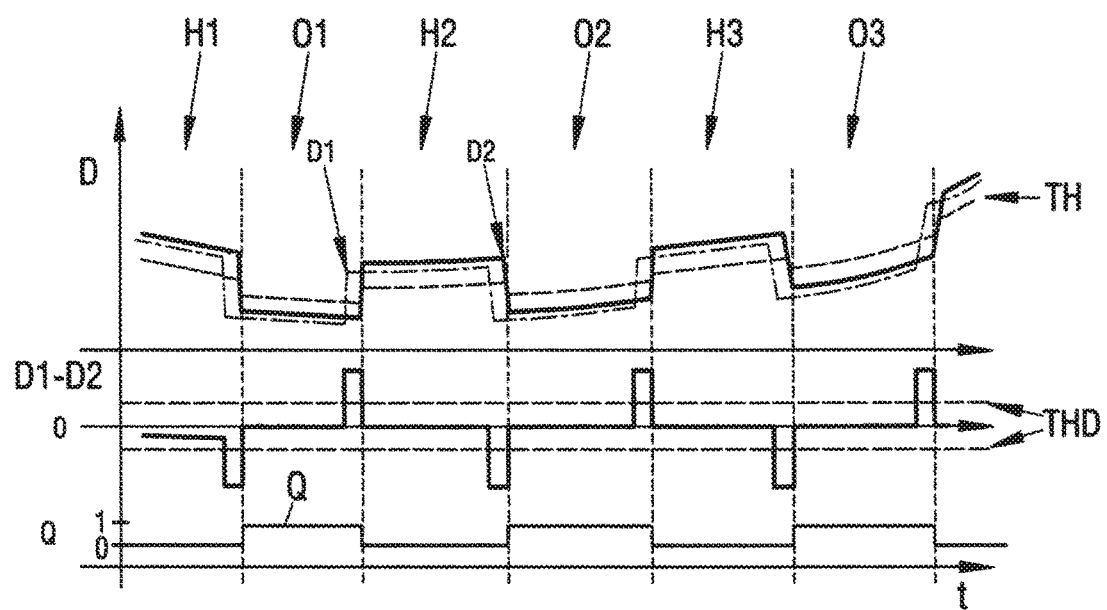

The invention will be explained by way of example in the following with reference to the drawings. There are shown:

FIG. 1 a schematic diagram that shows the time progression of a distance value and of an associated object detection signal that was generated by a triangulation light sensor in accordance with the prior art;

FIG. 2 a schematic side view of a triangulation light sensor in accordance with a first embodiment arranged above a conveying path;

FIG. 3 a schematic plan view of the triangulation light sensor of FIG. 2;

FIG. 4 a schematic plan view of a triangulation light sensor in accordance with a second embodiment;

FIG. 5 a schematic diagram that represents different temporal signal progressions for a triangulation light sensor in accordance with the present invention;

FIG. 6 a schematic plan view of a triangulation light sensor in accordance with a third embodiment; and FIG. 7 a schematic plan view of a triangulation light sensor in accordance with a fourth embodiment.

Components that are the same or similar are provided with the same reference numerals in the Figures.

FIG. 2 shows a first embodiment of a triangulation light sensor 10 that is arranged above a conveying path 18. Objects 20 can be conveyed on the conveying path 18 in a conveying direction F indicated by a double arrow.

The triangulation light sensor 10 comprises a light transmitter 12 that comprises two light sources 14A, 14B in the embodiment. Fewer or more light sources can be provided in accordance with variants.

The transmitted light emitted by the light sources 14A, 14B is directed with the aid of a common transmission optics 30 in the form of respective transmitted light beams 32A, 32B in the direction of a detection zone 16 where it is incident either on an object 20 or on the conveying path 18. The objects 20 here form the foreground while the conveying path 18 forms the background, Separate transmission optics can also be provided for each light source 14A, 14B instead of a common transmission optics 30.

The incident transmitted light is remitted by an object 20 or by the conveying path 18 in the direction of the triangulation light sensor 10 and is focused with the aid of a common reception optics 26 on a light receiver 22 of the triangulation light sensor 10 to form respective light spots 36A, 36B, with the light receiver 22 comprising a linear array of photosensitive reception elements 24 (FIG. 3). The light receiver 22 can, for example, have 128 reception elements 34 having a width of 800 µm and a length (in the line direction) of 34 µm. The object 20 and the reception light beams that were remitted on the incidence on the object 20 are shown dashed for reasons of better clarity. The position of a respective light spot 36A, 36B on the light receiver 22 in a triangulation direction T depends on the distance between the triangulation light sensor 10 and a point of incidence of a respective transmitted light beam 32A, 32B on an object 20 or on the conveyor path 18.

The light receivers 22 and the light sources 14A, 14B can be arranged on a common circuit board 34.

The light receiver 22 is connected to an evaluation unit 28 that evaluates the received signals of the reception elements 24 to determine respective distance values D and optionally to generate an object detection signal Q.

The evaluation unit 28 can additionally be connected to the light sources 14A, 14B to control them, in particular in a clocked manner.

FIG. 3 shows the triangulation light sensor 10 of FIG. 2 in a plan view. In this representation, the transmission optics 30 and the reception optics 26 are shown as dashed circles.

The light receiver 22 detects two light spots 36A, 36B, with the light spot 36A being associated with the light source 14A and with the light spot 36B being associated with the light source 14B. For reasons of clarity, only those light spots 36A, 36B are shown here that were generated by a remission of the conveying path 18. If the transmission optics 30 and the reception optics 26 have similar focal lengths, the distance of the light spots 36A, 36B from one another corresponds to the distance of the light sources 14A, 14B from one another for identical distances between the points of incidence and the light sensor 10.

Two virtual separation webs 38A, 38B are furthermore shown in FIG. 3 that correspond to a distance threshold value. If one of the transmitted light beams 32A, 32B is incident on an object 20 to be detected instead of on the conveying path 18, the corresponding light spot 36A or 36B migrates to the left to the other side of the respective virtual separation web 38A or 38B.

Different methods can generally be used to determine distance values from the light spot positions.

For a determination of distance values based on a method described in DE 199 66 701 A1, the evaluation unit 28 can comprise a multiplexer by which the reception elements 24 can be connected to one of three input channels CH1 to CH3. Those reception elements 24 that are to the right of the separation web 38A can, for example, be connected to the input channel CH1 that can also be called a far channel since it substantially comprises those reception elements 24 that receive light from the conveying path 18. The reception elements at the left of the separation web 38A are then connected to the input channel CH3 that can be called in a corresponding manner a near channel since it substantially receives those light beams that are remitted by an object 20. The input channel CH2 is only connected to that reception element 24 on which the virtual separation web 38A is disposed. A distance value D can generally be calculated using the following equation:

$$D=(CH1+a \times CH2-CH3)/(CH1+CH2+CH3),$$

where a is a factor having a value between 0 and 1 that enables a "fine tuning" of the virtual separation web 38A with subpixel accuracy. In general, the input channels CH1 and CH3 only have to be connected to so many reception elements 24 that the total light spot 36A can be detected. A first distance value D1 is determined on the basis of the position of the light spot 36A.

The position of the light spot 36B generated by the other light source 14B is evaluated in a corresponding manner. The configuration of the multiplexer is changed for this purpose so that the association of the reception elements 24 with the input channels CH1 to CH3 is oriented on the position of the separation path 38B. The calculation of a corresponding distance value D2 takes place accordingly.

The switchover of the configuration of the multiplexer takes place synchronously with a control of the light sources 14A and 14B such that, for example, a first configuration of the multiplexer that is oriented on the separation web 38A takes place synchronously with an activation of the light source 14A while a second configuration of the multiplexer that is oriented on the separation web 38B takes place synchronously with an activation of the light source 143. Always only one of the light sources 14A, 14B is thus active so that only one of the light spots 36A, 36B is actually incident on the light receiver 22.

A respective distance value D1 or D2 can thereby be determined separately from one another for each of the laterally mutually spaced apart points of incidence. The clock length, i.e. the time period between two switchovers can, for example, amount to 80 µs, with shorter or longer time periods also being able to be used here.

Different evaluation methods can also be used instead of the above-described position determination of the light spots 36A, 36B. For example, the reception elements 24 can be read individually in series or in parallel to determine an intensity distribution or a kind of spectrum and to subject it to a suitable data processing. The position determination can furthermore also take place on the basis of a calculation of the focal point, of the median, or of the intensity maximum or energy maximum of the light spots 36A, 36B.

Light sensors 10 in accordance with FIG. 2 are advantageously used for space reasons in the monitoring of conveying paths that convey a plurality of objects in parallel in lanes in accordance with the principle of lane conveying, the lanes being monitored independently of one another by respectively associated light sensors 10 spaced apart transversely to the conveying direction.

FIG. 4 shows a triangulation light sensor 10 in accordance with a second embodiment that can be arranged above the conveying path 18 in a similar manner to the light sensor 10 (FIG. 2). Unlike the embodiment of FIGS. 3 and 4, a two-line light receiver 122 is used here whose reception elements 124 are arranged in two rows extending in the triangulation direction T.

The triangulation direction T here extends, differing from the embodiment of FIGS. 3 and 4, transversely to the conveying direction F while the light sources 14A, 14B, however, are still spaced apart from one another in the conveying direction F. Two respective light spots 36A, 36B are again received by the light receiver 122, but, unlike FIGS. 3 and 4, they are not spaced apart from one another in the triangulation direction T, but are disposed next to one another so that each light spot 36A, 36B is associated with a respective line of the light receiver 122. The positions of both light spots 36A, 36B can be determined simultaneously or at least quasi-simultaneously, i.e. with a minimal time offset, by a corresponding evaluation of the light receiver 122. The evaluation of the received signals generated by the reception elements 124 takes place in an analog manner by an association of the reception elements oriented on the respective separation web 38A, 38B with one of the input channels CH1 to CH3, with a separate multiplexer being able to be provided for each line so that a configuration switchover is not necessary. The light sources 14A, 14B can correspondingly be operated in permanent operation or can at least be clocked simultaneously.

In accordance with a variant, however, a one-line light receiver (corresponding to the embodiment of FIG. 3) and a single multiplexer can also be used, with then an alternating clocking of the light sources 14A, 14B and with a corresponding switchover of the multiplex configuration again being required.

The generation and evaluation of the distance values D1 and D2 and the generation of the object detection signal Q will be described in the following with respect to FIG. 5. An initial distance threshold value TH is first fixed that is oriented on the distance of the conveying path 18 from the triangulation light sensor 10, 110 and the height or a minimum height of the objects 20 to be detected. A mean value between the distance from an object 20 having a minimum height and the distance from the conveying path can, for example, be assumed as the initial distance threshold value TH.

Subsequently, the light source 14A is activated and the position of the light spot 36A is evaluated to acquire the distance value D1 in a cycle. Subsequently, the light source 14B is activated and the position of the light spot 36B is evaluated to acquire the distance value D2.

A standardization of the distance values D1, D2 can advantageously take place so that they are the same for the same vertical location of the points of incidence, i.e. with an identical object distance or background distance. This can be done, for instance, by addition or subtraction of a constant offset.

An exemplary time progression of the distance values D1, D2 is shown in the upper part of FIG. 5 and corresponds to the progression of the distance value D in FIG. 1. The time progression of the distance value D1 is shown as a chain dotted line while the time progression of the distance value D2 is shown by a solid line. In a similar manner to FIG. 1, the time progression of the signals in FIG. 5 is divided into background zones H1 to H3 and object zones O1 to O3 whose borders are marked in FIG. 5 by vertical dashed lines that are oriented on the progression of the curve D2.

After the determination of the distance values D1, D2 at a point in time, the absolute amount of the difference between D1 and D2 is determined and is compared with a difference threshold value THD. The time progression of the difference between D1 and D2 is represented by the middle curve of FIG. 5.

If $$abs(D1-D2)<THD$$

applies, a new distance threshold value TH' is determined in accordance with the following conditions:

$$TH'=D2-H, \text{ if } D2>TH \quad \text{(Condition 1)},$$

$$TH'=D2+H, \text{ if } D2<TH \quad \text{(Condition 2)},$$

where H is a hysteresis value that represents a positive constant that is as small as possible. Condition 1 corresponds to a scanning of the background or of the conveying path 18 while Condition 2 corresponds to a scanning of the foreground or of an object 20. The determination of the hysteresis value H can be oriented on the determination of the initial value for the distance threshold value TH. The hysteresis value H can be fixedly specified or can be automatically adapted to disturbances that result in fluctuations of the distance values D1, D2 and/or can be adapted to last recognized jumps in the distance values D1, D2.

A modification of the new distance threshold value TH' can optionally take place if it differs too much from the previous distance threshold value TH. The determination of the new distance threshold value TH' on the basis of the distance value D2 is only exemplary here. The distance value D1 or a mean value of D1 and D2 could thus also be used as the basis.

In a next step, the previous distance threshold value TH is then replaced with the new distance threshold value TH'.

If therefore the difference between D1 and D2 is smaller than the difference threshold value THD, it is assumed that a slow change of the distance of the conveying path 18 from the triangulation light sensor 10, 110 is present. In this case, the distance threshold value TH is continuously adapted. A corresponding progression of the distance threshold value TH is shown as a dashed line in the upper part of FIG. 5.

If it is, however, found, that the amount of the difference between D1 and D1 is larger than or equal to the difference threshold value THD, an adaptation of the distance threshold value TH is not carried out. This is the case when an object 20 is only detected by one of the transmitted light beams 32A or 32B and if the other transmitted light beam 32B or 32A is incident on the conveying path 18. Even if an object 20 having a very slanted surface results in an exceeding of the difference threshold value THD, no adaptation of the distance threshold value TH is carried out.

In a next cycle, the above-described steps are then carried out in a corresponding manner.

Only the distance value D2 is used in the embodiment for the actual generation of the object detection signal Q that can generally take place before or after an adaptation of the distance threshold value TH. Alternatively, the value D1 or also the mean value of D1 and D2 could also be observed.

As can easily be recognized in FIG. 5, an adaptation of the distance threshold value TH takes place both in the back ground zones H1 to H3 and in the object zones O1 to O3, with a sufficient distance of the distance threshold value TH from the distance values D1 or D 2 respectively always being present so that a reliable generation of the object detection signal Q is always given. Its progression is shown in the lower part of FIG. 5. A comparison with FIG. 1 shows that a reliable object recognition is also always possible with the aid of the triangulation light sensor 10, 110 in accordance with the invention in the previously critical object zone O3 where an object detection had incorrectly not taken place with a light sensor in accordance with the prior art.

In accordance with a variant, an adaptation of the distance threshold value can also take place with a triangulation light sensor that only has one light source and in which a difference of distance values and thus an edge detection is not possible. The hereby lacking possibility of the detection of object edges or of greatly slanted surfaces can, however, be compensated in a different manner, for example by a monitoring of the time progression of the distance value.

In accordance with further variants of the light sensors 10, 110, light sensors having more than two light sources can also be used.

FIG. 6 thus shows a light sensor 210 that comprises three light sources 14A to 14C arranged in the form of an L and a one-line light receiver 22. The distances between the light sources 14A and 14B and between the light sources 14B and 14C are advantageously the same. In a cycle, alternatively or additionally to the activation of the light source 14A and the evaluation of the position of the light spot 36A, the light source 140 is activated and the position of a light spot 360 generated by the light source 14C is evaluated to acquire a distance value D3. The triangulation direction T of the light sensor 210 can be aligned and operated both along the conveying direction F (corresponding to the arrangement of FIGS. 2 and 3) and transversely thereto (corresponding to the arrangement of FIG. 4), with only the two light sources 14A and 14B or 14B and 14C disposed after one another in the conveying direction F being operated in dependence on the alignment. The switchover between two operating modes can take place automatically or manually. The advantage is that the same light sensor 210 can be used for both operating modes.

Instead of a one-line light receiver, a two-line light receiver can also be used in accordance with a variant.

In accordance with a further variant of the light sensor 210, all three light sources 14A to 14C can be operated simultaneously or sequentially after one another within a respective cycle. A new calculation of the switching threshold TH' takes place in a variant of the above-named Conditions 1 and 2 in accordance with the following conditions:

$TH'=D2-H$, if $D2>TH$ AND $\mathrm{abs}(D1-D2)<THD$ AND $\mathrm{abs}(D3-D2)<THD$    (Condition 1'), $TH'=D2+H$, if $D2<TH$ AND $\mathrm{abs}(D1-D2)<THD$ AND $\mathrm{abs}(D3-D2)<THD$    (Condition 2'), where H is the hysteresis value already explained above. Condition 1' corresponds to a scanning of the background or of the conveying path 18 while Condition 2' corresponds to a scanning of the foreground or of an object 20. If neither of the conditions 1' or 2' is satisfied, TH'=TH applies, i.e. no adaptation of the distance threshold value TH takes place. The determination of the new distance threshold value TH' on the basis of the distance value D2 is only exemplary here. The distance value D1 or D3 or a mean value of D1, D2 and/or D3 could thus also be used as the basis.

In accordance with a further variant, not shown of the light sensor 10 (FIG. 2) or of the light sensor 110 (FIG. 4), three light sources that are arranged in a row and that can preferably be sequentially activated can be provided instead of the two light sources 14A, 14B, with the adaptation of the distance threshold value TH being able to take place in accordance with Conditions 1' and 2' described above for the light sensor 210 (FIG. 6). The fixing of the order of the light source activation for adaptation to the conveying direction can take place manually or automatically during a start phase or a teaching phase on the basis of an automatic recognition of the conveying device.

FIG. 7 shows a light sensor 310 in accordance with a further variant that comprises four light sources 14A to 14D arranged in the form of a rectangle or of a square and a two-line light receiver 122 for detecting the light spots 36A to 36D. The distances between the light sources 14A and 14B and between the light sources 14C and 14D and in particular also the distances between the light sources 14A and 14C and between the light sources 14B and 14D are advantageously the same.

In a cycle, the light sources 14A to 14D are activated cyclically after one another and associated distance values D1 to D4 are determined by evaluation of the respective positions of the associated light spots 36A to 36D. Two respective light sources can also be simultaneously activated, e.g. the light sources 14A and 14C or the light sources 14B and 14D. The triangulation direction T of the light sensor 310 can be aligned and operated both along the conveying direction F (corresponding to the arrangement of FIGS. 2 and 3) and transversely thereto (corresponding to the arrangement of FIG. 4). A switchover between both operating modes is not required. A one-line light receiver can also be used in accordance with a variant instead of the two-line light receiver 122.

The following averaged distance values are now determined:

$D1'=(D1+D2)/2$    (Light sources 14A and 14B)

$D2'=(D3+D4)/2$    (Light sources 14C and 14D)

$D3'=(D1+D3)/2$    (Light sources 14A and 14C)

$D4'=(D2+D4)/2$    (Light sources 14B and 14D)

A new calculation of the switching threshold TH' takes place in a variant of the above-named Conditions 1' and 2' in accordance with the following conditions:

$TH'=D2-H$, if $D2>TH$ AND $\mathrm{abs}(D1'-D2')<THD$ AND $\mathrm{abs}(D3'-D4')<THD$    (Condition 1"), $TH'=D2+H$, if $D2<TH$ AND $\mathrm{abs}(D1'-D2')<THD$ AND $\mathrm{abs}(D3'-D4')<THD$    (Condition 2"), where H is the hysteresis value already explained above. Condition 1" corresponds to a scanning of the background or of the conveying path 18 while Condition 2" corresponds to a scanning of the foreground or of an object 20. The #determination of the new distance threshold value TH' on the basis of the distance value D2 is only exemplary here. One or more distance values D1 to D4 or averaged distance values D1' to D4' could also be used as the basis.

In accordance with a further variant, the light sensor 210 (FIG. 6) or the light sensor 310 (FIG. 7) can be adapted to determine their installation location, i.e. the alignment of the triangulation direction T with respect to the conveying direction F, in a teaching mode lasting a plurality of cycles with an optionally reduced frequency of the distance threshold value determination.

A check is made for this purpose in the teaching mode for the light sensor 210 (FIG. 6) which of the conditions $$\text{abs}(D1-D2)<THD$$

$$\text{abs}(D3-D2)<THD$$

is satisfied statistically more frequently.

A check is made in the teaching mode for the light sensor 310 (FIG. 7) which of the conditions $$\text{abs}(D1'-D2')<THD$$

$$\text{abs}(D3'-D4')<THD$$

is satisfied statistically more frequently.

This is based on the idea that the transmitted light beams from those light sources that are disposed on a straight line transversely to the conveying direction are as a rule incident approximately synchronously with one another either both on one object or both on the background. Above all distance differences in the conveying direction are, however, of interest for the method of threshold value adaptation in accordance with the invention, said distance differences, however, substantially only being able to be determined by means of those light sources that are disposed on a straight line extending along the conveying direction. The condition for those light sources that are disposed on a straight line transversely to the conveying direction is satisfied statistically less frequently. This condition can be ignored in a subsequent normal operation or a determination of the distance values underlying this condition or the activation of the respective light sources can be dispensed with so that the cycle duration is correspondingly shortened and the adaptation frequency of the distance threshold value is increased.

Only the distance value D2 is also used in the variants for the actual generation of the object detection signal Q. Alternatively, other distance values or also mean values from two or more distance values could also be looked at.

REFERENCE NUMERAL LIST 10, 110, 210, 310 triangulation light sensor
12 light transmitter
14A-14D light source
16 detection zone
18 conveying path
20 object
22, 122 light receiver
24, 124 reception element
26 reception optics
28 evaluation unit
30 transmission optics
32A, 32B transmitted light beam
34 circuit board
36A, 36B light spot
38A, 38B separation web
D, D1, D2, D3, D4,
D1', D2', D3', D4' distance value
F conveying direction
H hysteresis value
H1, H2, H3 background zone
O1, O2, O3 object zone
T triangulation direction
TH, TH', TH1, TH2 distance threshold value
THD difference threshold value

The invention claimed is:

1. A triangulation light sensor for the detection of objects on a conveying path, the triangulation light sensor comprising
a light transmitter for transmitting transmitted light into a detection zone that extends over a partial region of the conveying path;
a light receiver having an array of reception elements for receiving light that is remitted from the detection zone by one of an object to be detected and the conveyor path, wherein the array of reception elements extends at least in a triangulation direction, and wherein the reception elements generate respective received signals;
a reception optics arranged in the optical path between the detection zone and the light receiver for generating at least one light spot from the remitted light on the light receiver, wherein the position of the at least one light spot on the light receiver in the triangulation direction results in dependence on the distance of a point of incidence of the transmitted light on one of an object to be detected and the conveyor path from the triangulation light sensor; and
an evaluation unit that is configured for generating an object detection signal from the received signals, wherein an object detection signal is only generated when a distance value of the point of incidence determined on the light receiver with reference to the position of the at least one light spot on the light receiver falls below a predefined distance threshold value;
wherein the evaluation unit is configured to replace the previous distance threshold value cyclically with a new distance threshold value, with the new distance threshold value being determined by a currently determined distance value less a predefined first hysteresis value when the currently determined distance value is greater than the previous distance threshold value and/or the new distance threshold value is determined by the currently determined distance value plus a predefined second hysteresis value when the currently determined distance value is smaller than the previous distance threshold value.

2. The triangulation light sensor in accordance with claim 1,
wherein the first and second hysteresis values are the same.

3. The triangulation light sensor in accordance with claim 1,
wherein the new distance threshold value determined from the distance value and one of the hysteresis values is modified before the replacement of the previous distance threshold value such that a change of the new distance threshold value does not exceed a predefined measure in comparison with the previous distance threshold value.

4. The triangulation light sensor in accordance with claim 1,
wherein the light transmitter comprises at least two light sources for transmitting respective transmitted light beams,
with the light sources being arranged such that the transmitted light beams are incident on one of an object to be detected and the conveying path at laterally mutually spaced apart points of incidence, with the evaluation unit being configured to determine a respective distance value for each transmitted light beam; and
with the replacement of the distance threshold value only taking place when the difference of the respective distance values determined for the mutually spaced apart points of incidence is smaller than a predefined difference threshold value.

5. The triangulation light sensor in accordance with claim 4,
wherein the replacement of the distance threshold value further only takes place when the difference of the respective distance values determined for the mutually spaced apart points of incidence is smaller for a predetermined time period than the predefined distance threshold value.

6. The triangulation light sensor in accordance with claim 4,
wherein the replacement of the distance threshold value takes place such that respective instantaneous distance threshold values are determined for a predefined number of cycles and the new distance threshold value is determined on the basis of an averaging process from the instantaneous distance threshold values.

7. The triangulation light sensor in accordance with claim 4,
wherein the points of incidence are at least spaced apart from one another along a conveying direction of the conveying path.

8. The triangulation light sensor in accordance with claim 4,
wherein the light sources are arranged such that the light spots generated on the light receiver by the respective transmitted light beams for the same distances of the respective points of incidence from the triangulation light sensor are spaced apart from one another.

9. The triangulation light sensor in accordance with claim 8,
wherein the light sources are arranged such that the light spots generated on the light receiver by the respective transmitted light beams for the same distances of the respective points of incidence from the triangulation light sensor are spaced apart from one another in the triangulation direction.

10. The triangulation light sensor in accordance with claim 4,
wherein the light sources can be activated in a time-offset, clocked manner so that only one of the light sources transmits transmitted light at a given point in time.

11. The triangulation light sensor in accordance with claim 4,
wherein the triangulation direction extends in parallel with a conveying direction of the conveying path.

12. The triangulation light sensor in accordance with claim 4,
wherein the light transmitter comprises three light sources, with a respective two of the light sources being disposed on one of two straight lines that intersect at a right angle in one of the light sources, and with one of the straight lines extending in parallel with the triangulation direction.

13. The triangulation light sensor in accordance with claim 12,
wherein only distance values for two light sources are determined or taken into account for an operation of the light sensor.

14. The triangulation light sensor in accordance with claim 4,
wherein the light transmitter comprises four light sources that are arranged on corner points of an imaginary rectangle, with one of the sides of the rectangle extending in parallel with the triangulation direction.

15. The triangulation light sensor in accordance with claim 14,
wherein the four light sources are arranged on corner points of an imaginary square.

16. The triangulation light sensor in accordance with claim 4,
wherein the distance of the light sources is smaller than or equal to 1 mm.

17. The triangulation light sensor in accordance with claim 16,
wherein the distance of the light sources is smaller than or equal to 200 µm.

18. The triangulation light sensor in accordance with claim 4,
wherein the light sources are integrated on a single carrier.

19. The triangulation light sensor in accordance with claim 18,
wherein the light sources are integrated on a single semiconductor substrate.

20. The triangulation light sensor in accordance with claim 18,
wherein the light sources are integrated on a single carrier in the form of a multipixel LED.

* * * * *